(12) United States Patent
Rosenberg et al.

(10) Patent No.: US 7,113,166 B1
(45) Date of Patent: Sep. 26, 2006

(54) FORCE FEEDBACK DEVICES USING FLUID BRAKING

(75) Inventors: Louis B. Rosenberg, San Jose, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/547,782

(22) Filed: Apr. 12, 2000

Related U.S. Application Data

(63) Continuation-in-part of application No. 09/028,082, filed on Feb. 23, 1998, now Pat. No. 6,486,872, which is a continuation of application No. 08/965,720, filed on Nov. 7, 1997, now Pat. No. 6,166,723, and a continuation of application No. 08/489,068, filed on Jun. 9, 1995, now Pat. No. 5,721,566.

(60) Provisional application No. 60/128,975, filed on Apr. 12, 1999.

(51) Int. Cl.
*G09G 5/00* (2006.01)

(52) U.S. Cl. .................. 345/156; 345/157; 715/701

(58) Field of Classification Search ............... 345/156, 345/157, 158, 163, 168, 173, 161, 184; 463/37, 463/38, 30, 31; 434/11, 45; 715/701, 702
See application file for complete search history.

(56) References Cited

U.S. PATENT DOCUMENTS

| | | | |
|---|---|---|---|
| 2,906,179 A | 9/1959 | Bower | |
| 2,972,140 A | 2/1961 | Hirsch | |
| 3,157,853 A | 11/1964 | Hirsch | |
| 3,220,121 A | 11/1965 | Cutler | |
| 3,490,059 A | 1/1970 | Paulsen et al. | |
| 3,497,668 A | 2/1970 | Hirsch | |
| 3,517,446 A | 6/1970 | Corlyon et al. | |
| 3,531,868 A | 10/1970 | Stevenson | |
| 3,623,064 A | 11/1971 | Kagan | |
| 3,765,624 A | 10/1973 | Kaniuka | |

(Continued)

FOREIGN PATENT DOCUMENTS

EP 0 349 086 A1 1/1990

(Continued)

OTHER PUBLICATIONS

Adachi, Yoshitaka, et al., Sensory Evaluation of Virtual Haptic Push-Buttons, Technical Research Center Suzuki Motor Corporation.

(Continued)

*Primary Examiner*—Xiao Wu
(74) *Attorney, Agent, or Firm*—Thelen Reid & Priest LLP; David B. Ritchie

(57) ABSTRACT

A haptic feedback device including a fluid viscosity-controlled brake that outputs high forces to the device user at low cost while maintaining inherent safety. An interface device includes a manipulandum physically contacted by the user. A sensor senses a position of the manipulandum and outputs a sensor signal. The interface device also includes a brake including a field-controlled fluid having a viscosity that can be controlled by controlling an electric current in a coil, where a resistive force or drag on the manipulandum is controlled by controlling the fluid's viscosity. The fluid can be an electrorheological fluid controlled by an electric field or a magnetorheological fluid controlled by a magnetic field. In one preferred embodiment, the resistive force is controlled by adjusting a degree of contact of the brake with the manipulandum based on the fluid's viscosity. Disclosed embodiments include fishing devices, bicycle simulators, and control knobs.

21 Claims, 7 Drawing Sheets

U.S. PATENT DOCUMENTS

| | | | |
|---|---|---|---|
| 3,795,150 A | 3/1974 | Eckhardt | |
| 3,832,895 A | 9/1974 | Strandh | |
| 3,875,488 A | 4/1975 | Crocker et al. | |
| 3,890,958 A | 6/1975 | Fister et al. | |
| 3,902,687 A | 9/1975 | Hightower | |
| 3,903,614 A | 9/1975 | Diamond et al. | |
| 3,911,416 A | 10/1975 | Feder | |
| 3,919,691 A | 11/1975 | Noll | |
| 3,944,798 A | 3/1976 | Eaton | |
| 4,127,752 A | 11/1978 | Lowthorp | |
| 4,160,508 A | 7/1979 | Frosch et al. | |
| 4,184,014 A | 1/1980 | Dey | |
| 4,216,467 A | 8/1980 | Colston | |
| 4,227,319 A | 10/1980 | Guy et al. | |
| 4,236,325 A | 12/1980 | Hall et al. | |
| 4,262,549 A | 4/1981 | Schwellenbach | |
| 4,333,070 A | 6/1982 | Barnes | |
| 4,391,282 A | 7/1983 | Ando et al. | |
| 4,398,889 A | 8/1983 | Lam et al. | |
| 4,414,984 A | 11/1983 | Zarudiansky | |
| 4,436,188 A | 3/1984 | Jones | |
| 4,448,083 A | 5/1984 | Hayashi | |
| 4,464,117 A | 8/1984 | Foerst | |
| 4,477,043 A | 10/1984 | Repperger | |
| 4,477,973 A | 10/1984 | Davies | |
| 4,484,191 A | 11/1984 | Vavra | |
| 4,489,304 A | 12/1984 | Hayes | |
| 4,513,235 A | 4/1985 | Acklam et al. | |
| 4,550,221 A | 10/1985 | Mabusth | |
| 4,550,617 A | 11/1985 | Fraignier et al. | |
| 4,560,983 A | 12/1985 | Williams | |
| 4,571,834 A | 2/1986 | Fraser et al. | |
| 4,581,491 A | 4/1986 | Boothroyd | |
| 4,593,470 A | 6/1986 | Davies | |
| 4,599,070 A | 7/1986 | Hladky et al. | |
| 4,601,206 A | 7/1986 | Watson | |
| 4,604,016 A | 8/1986 | Joyce | |
| 4,632,341 A | 12/1986 | Repperger et al. | |
| 4,638,798 A | 1/1987 | Shelden et al. | |
| 4,653,011 A | 3/1987 | Iwano | |
| 4,654,648 A | 3/1987 | Herrington et al. | |
| 4,676,002 A | 6/1987 | Slocum | |
| 4,679,331 A | 7/1987 | Koontz | |
| 4,688,983 A | 8/1987 | Lindbom | |
| 4,689,449 A | 8/1987 | Rosen | |
| 4,703,443 A | 10/1987 | Moriyasu | |
| 4,704,909 A | 11/1987 | Grahn et al. | |
| 4,706,294 A | 11/1987 | Ouchida | |
| 4,708,656 A | 11/1987 | de Vries et al. | |
| 4,713,007 A | 12/1987 | Alban | |
| 4,750,487 A | 6/1988 | Zanetti | |
| 4,758,692 A | 7/1988 | Roeser et al. | |
| 4,769,763 A | 9/1988 | Trieb et al. | |
| 4,782,327 A | 11/1988 | Kley et al. | |
| 4,787,051 A | 11/1988 | Olson | |
| 4,791,934 A | 12/1988 | Brunnett | |
| 4,794,388 A | 12/1988 | Matthews | |
| 4,794,392 A | 12/1988 | Selinko | |
| 4,798,919 A | 1/1989 | Miessler et al. | |
| 4,800,721 A | 1/1989 | Cemenska et al. | |
| 4,803,413 A | 2/1989 | Kendig et al. | |
| 4,811,608 A | 3/1989 | Hilton | |
| 4,819,195 A | 4/1989 | Bell et al. | |
| 4,823,634 A | 4/1989 | Culver | |
| 4,825,157 A | 4/1989 | Mikan | |
| 4,839,838 A | 6/1989 | LaBiche et al. | |
| 4,849,692 A | 7/1989 | Blood | |
| 4,861,269 A | 8/1989 | Meenen, Jr. | |
| 4,868,549 A | 9/1989 | Affinito et al. | |
| 4,874,998 A | 10/1989 | Hollis, Jr. | |
| 4,879,556 A | 11/1989 | Duimel | |
| 4,885,565 A | 12/1989 | Embach | |
| 4,888,877 A | 12/1989 | Enderle et al. | |
| 4,891,764 A | 1/1990 | McIntosh | |
| 4,891,889 A | 1/1990 | Tomelleri | |
| 4,907,970 A | 3/1990 | Meenen, Jr. | |
| 4,907,973 A | 3/1990 | Hon | |
| 4,930,770 A | 6/1990 | Baker | |
| 4,934,694 A | 6/1990 | McIntosh | |
| 4,942,545 A | 7/1990 | Sapia | |
| 4,945,305 A | 7/1990 | Blood | |
| 4,945,501 A | 7/1990 | Bell et al. | |
| 4,949,119 A | 8/1990 | Moncrief et al. | |
| 4,961,038 A | 10/1990 | MacMinn | |
| 4,961,138 A | 10/1990 | Gorniak | |
| 4,961,267 A | 10/1990 | Herzog | |
| 4,962,448 A | 10/1990 | DeMaio et al. | |
| 4,962,591 A | 10/1990 | Zeller et al. | |
| 4,982,504 A | 1/1991 | Soderberg et al. | |
| 4,983,786 A | 1/1991 | Stevens et al. | |
| 4,983,901 A | 1/1991 | Lehmer | |
| 4,994,669 A | 2/1991 | Stern | |
| 5,007,085 A | 4/1991 | Greanias et al. | |
| 5,007,300 A | 4/1991 | Siva | |
| 5,019,761 A | 5/1991 | Kraft | |
| 5,022,384 A | 6/1991 | Freels et al. | |
| 5,022,407 A | 6/1991 | Horch et al. | |
| 5,035,242 A | 7/1991 | Franklin et al. | |
| 5,038,089 A | 8/1991 | Szakaly | |
| 5,040,306 A | 8/1991 | McMurtry et al. | |
| 5,044,956 A | 9/1991 | Behensky et al. | |
| 5,050,608 A | 9/1991 | Watanabe et al. | |
| 5,072,361 A | 12/1991 | Davis et al. | |
| 5,076,517 A | 12/1991 | Ferranti et al. | |
| 5,078,152 A | 1/1992 | Bond et al. | |
| 5,088,046 A | 2/1992 | McMurtry | |
| 5,088,055 A | 2/1992 | Oyama | |
| 5,095,303 A | 3/1992 | Clark et al. | |
| 5,103,404 A | 4/1992 | McIntosh | |
| 5,107,080 A | 4/1992 | Rosen | |
| 5,116,051 A | 5/1992 | Moncrief et al. | |
| 5,126,948 A | 6/1992 | Mitchell et al. | |
| 5,128,671 A | 7/1992 | Thomas, Jr. | |
| 5,131,844 A | 7/1992 | Marinaccio et al. | |
| 5,132,672 A | 7/1992 | Clark | |
| 5,139,261 A | 8/1992 | Openiano | |
| 5,142,506 A | 8/1992 | Edwards | |
| 5,142,931 A | 9/1992 | Menahem | |
| 5,143,505 A | 9/1992 | Burdea et al. | |
| 5,146,566 A | 9/1992 | Hollis, Jr. et al. | |
| 5,148,377 A | 9/1992 | McDonald | |
| 5,165,897 A | 11/1992 | Johnson | |
| 5,175,459 A | 12/1992 | Danial et al. | |
| 5,178,012 A | 1/1993 | Culp | |
| 5,181,181 A | 1/1993 | Glynn | |
| 5,182,557 A | 1/1993 | Lang | |
| 5,184,306 A | 2/1993 | Erdman et al. | |
| 5,184,319 A | 2/1993 | Kramer | |
| 5,185,561 A | 2/1993 | Good et al. | |
| 5,186,629 A | 2/1993 | Rohen | |
| 5,186,695 A | 2/1993 | Mangseth et al. | |
| 5,187,874 A | 2/1993 | Takahashi et al. | |
| 5,189,355 A | 2/1993 | Larkins et al. | |
| 5,189,806 A | 3/1993 | McMurtry et al. | |
| 5,193,963 A | 3/1993 | McAffee et al. | |
| 5,204,824 A | 4/1993 | Fujimaki | |
| 5,209,131 A | 5/1993 | Baxter | |
| 5,212,473 A | 5/1993 | Louis | |
| 5,220,260 A | 6/1993 | Schuler | |
| 5,223,776 A | 6/1993 | Radke et al. | |
| 5,228,356 A | 7/1993 | Chuang | |
| 5,230,623 A | 7/1993 | Guthrie et al. | |
| 5,235,868 A | 8/1993 | Culver | |
| 5,240,417 A | 8/1993 | Smithson et al. | |

| | | |
|---|---|---|
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |
| 5,262,777 A | 11/1993 | Low et al. |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,277,281 A | 1/1994 | Carlson et al. |
| 5,283,970 A | 2/1994 | Aigner |
| 5,284,330 A | 2/1994 | Carlson et al. |
| 5,286,203 A | 2/1994 | Fuller et al. |
| 5,296,846 A | 3/1994 | Ledley |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,351,692 A | 10/1994 | Dow et al. |
| 5,354,162 A | 10/1994 | Burdea et al. |
| 5,379,663 A | 1/1995 | Hara |
| 5,381,080 A | 1/1995 | Schnell et al. |
| 5,384,460 A | 1/1995 | Tseng |
| 5,389,865 A | 2/1995 | Jacobus et al. |
| 5,390,296 A | 2/1995 | Crandall et al. |
| 5,396,266 A | 3/1995 | Brimhall |
| 5,396,267 A | 3/1995 | Bouton |
| 5,397,323 A | 3/1995 | Taylor et al. |
| 5,402,582 A | 4/1995 | Raab |
| 5,405,152 A | 4/1995 | Katanics et al. |
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,436,542 A | 7/1995 | Petelin et al. |
| 5,436,622 A | 7/1995 | Gutman et al. |
| 5,436,640 A | 7/1995 | Reeves |
| 5,437,607 A | 8/1995 | Taylor |
| 5,440,183 A | 8/1995 | Denne |
| 5,445,166 A | 8/1995 | Taylor |
| 5,451,924 A | 9/1995 | Massimino et al. |
| 5,459,382 A | 10/1995 | Jacobus et al. |
| 5,466,213 A | 11/1995 | Hogan et al. |
| 5,467,763 A | 11/1995 | McMahon et al. |
| 5,492,312 A | 2/1996 | Carlson |
| 5,513,100 A | 4/1996 | Parker et al. |
| 5,542,672 A | 8/1996 | Meredith |
| 5,547,382 A | 8/1996 | Yamasaki et al. |
| 5,575,761 A | 11/1996 | Hajianpour |
| 5,577,981 A | 11/1996 | Jarvik |
| 5,580,249 A * | 12/1996 | Jacobsen et al. ............... 434/11 |
| 5,584,700 A | 12/1996 | Feldman et al. |
| 5,587,937 A | 12/1996 | Massie et al. |
| 5,589,828 A | 12/1996 | Armstrong |
| 5,629,594 A | 5/1997 | Jacobus et al. |
| 5,666,138 A | 9/1997 | Culver |
| 5,669,818 A | 9/1997 | Thorner et al. |
| 5,690,582 A | 11/1997 | Ulrich et al. |
| 5,696,537 A | 12/1997 | Solhjell |
| 5,701,140 A | 12/1997 | Rosenberg et al. |
| 5,709,219 A | 1/1998 | Chen et al. |
| 5,711,746 A | 1/1998 | Carlson |
| 5,721,566 A | 2/1998 | Rosenberg et al. |
| 5,734,373 A | 3/1998 | Rosenberg et al. |
| 5,739,811 A | 4/1998 | Rosenberg et al. |
| 5,742,278 A | 4/1998 | Chen et al. |
| 5,749,533 A * | 5/1998 | Daniels ...................... 242/287 |
| 5,755,577 A | 5/1998 | Gillio |
| 5,766,016 A | 6/1998 | Sinclair et al. |
| 5,767,839 A | 6/1998 | Rosenberg |
| 5,769,640 A | 6/1998 | Jacobus et al. |
| 5,781,172 A | 7/1998 | Engel et al. |
| 5,782,639 A | 7/1998 | Beal |
| 5,784,052 A | 7/1998 | Keyson |
| 5,785,630 A | 7/1998 | Bobick et al. |
| 5,790,108 A | 8/1998 | Salcudean et al. |
| 5,805,140 A | 9/1998 | Rosenberg et al. |
| 5,816,823 A | 10/1998 | Naimark et al. |
| 5,821,920 A | 10/1998 | Rosenberg et al. |
| 5,823,876 A | 10/1998 | Unbehand |
| 5,872,438 A | 2/1999 | Roston |
| 5,889,670 A | 3/1999 | Schuler et al. |
| 5,890,995 A | 4/1999 | Bobick et al. |
| 5,897,437 A | 4/1999 | Nishiumi et al. |
| 5,944,151 A | 8/1999 | Jakobs et al. |
| 5,980,256 A | 11/1999 | Carmein |
| 5,984,880 A | 11/1999 | Lander et al. |
| 5,986,643 A | 11/1999 | Harvill et al. |
| 6,001,014 A | 12/1999 | Ogata et al. |
| 6,004,134 A | 12/1999 | Marcus et al. |
| 6,004,243 A | 12/1999 | Ewert |
| 6,088,019 A | 7/2000 | Rosenberg |
| 6,100,874 A | 8/2000 | Schena et al. |
| 6,111,577 A | 8/2000 | Zilles et al. |
| 6,128,006 A | 10/2000 | Rosenberg et al. |
| 6,160,489 A | 12/2000 | Perry et al. |
| 6,184,868 B1 | 2/2001 | Shahoian et al. |
| 6,215,470 B1 | 4/2001 | Rosenberg et al. |
| 6,256,011 B1 | 7/2001 | Culver |
| 6,271,828 B1 | 8/2001 | Rosenberg et al. |
| 6,275,213 B1 | 8/2001 | Tremblay et al. |
| 6,300,938 B1 | 10/2001 | Culver |
| 6,310,604 B1 * | 10/2001 | Furusho et al. ............. 345/156 |
| 6,339,419 B1 * | 1/2002 | Jolly et al. ................. 345/156 |
| 6,422,941 B1 | 7/2002 | Thorner et al. |

FOREIGN PATENT DOCUMENTS

| | | |
|---|---|---|
| EP | 0626634 | 11/1994 |
| GB | 2254911 A | 10/1992 |
| JP | 2-079892 | 3/1990 |
| JP | H2-185278 | 7/1990 |
| JP | H4-8381 | 1/1992 |
| JP | 4-34612 | 2/1992 |
| JP | H5-192449 | 8/1993 |
| JP | H7-24147 | 1/1995 |
| WO | WO95/02233 | 1/1995 |
| WO | WO95/20788 | 8/1995 |
| WO | WO9520787 | 8/1995 |
| WO | WO9520877 | 8/1995 |
| WO | WO 95/32459 | 11/1995 |
| WO | WO9616397 | 5/1996 |
| WO | WO9622591 | 7/1996 |

OTHER PUBLICATIONS

Adelstein Bernard D. et al., "A High Performance Two Degree-of-Freedom Kinesthetic Interface," Massachusetts Institute of Technology 1992, pp. 108-112.

Adelstein, Bernard D. et al., "Design and Implementation of a Force Reflecting Manipulation for Manual Control Research," 1992, pp. 1-24.

Atkinston, William D. et al, "Computing with Feeling," Comput. & Graphics, vol. 2, 1977, pp. 97-103.

Batter, James J. et al., "Grope-1: A Computer Display to the Sense of Feel," Proc. IFIP Congress, 1971, pp. 759-763.

Bejczy, Antal K., "The Phantom Robot: Predictive Displays for Teleoperation with Time Delay," IEEE 1990, pp. 546-550.

Burdea, G. et al., "A Portable Dextrous Master with Force Feedback," Presence: Teleoperators and Virtual Environments, MIT Press, Jun. 1991.

Burdea, Grigore et al., "Dextrous Telerobotics with Force Feedback—An Overview," Robotica 1991, vol. 9.

Burdea, Grigore et al., "Distributed Virtual Force Feedback," IEEE, May 2, 1993, pp. 25-44.

Buttolo, Pietro et al., "Pen-Based Force Display for Precision Manupulation in Virtual Environments," IEEE Mar. 1995, pp. 1-8.

Colgate J. Edward et al., Implementation of Stiff Virtual Walls in Force-Reflecting Interfaces, Sep. 22, 1993.

Ellis, R.E. et al., "Design and Evalusation of a High-Performance Prototype Planar Haptic Interface," ASME Dec. 3, 1993, DSC—vol. 49, pp. 55-64.

Gotow, J.K., et al., "Perception of Mechanical Properties at the Man-Machine Interface," IEEE 1987, pp. 688-689.

Hannaford, Blake et al., "Performance Evaluation of a Six-Axis Generalized Force-Reflecting Teleoperator", IEEE 1991, vol. 21, No. 3, pp. 620-633.

Howe, Robert D., "Task Performance with a Dextrous Teleoperated Hand System," Proceedings of SPIE, Nov. 1992, vol. 1833, pp. 1-9.

Kim, Won S. et al., "A Teleoperation Training Simulator with Visual and Kinesthetic Force Virtual Reality."

Kotoku, Tetsuo et al., "Environment Modeling for the Interactive Display (EMID) Used in Telerobotic Systems," IEEE 1991, pp. 99-1004.

Kotoku, Tetsuo, "A Predictive Display with Force Feedback and its Application to Remote Manipulation System with Transmission Time Delay," 1992, Proc. of 1992 IEEE/RSJ Int'l Conf. on Intelligent Robots and Systems.

Minsky, Margaret et al., "Feeling and Seeing: Issues in Force Display," ACM 1990, pp. 235-242.

Ouh-young, Ming et al., "Using a Manipulator for Force Display in Molecular Docking," IEEE 1988, pp. 1824-1829.

Ouh-Young, Ming, "Force Display in Molecular Docking," Chapel Hill 1990, pp. 1-85.

Rosenberg, Louis B. et al., "Perceptual Decomposition of Virtual Haptic Surfaces," IEEE, Oct. 1993.

Rosenberg, Louis B., "Perceptual Design of a Virtual Rigid Surface Contact," Center for Design Research Stanford University, Air Force Material Command, Apr. 1993, pp. 1-41.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Russo, Massimo, "The Design and Implementation of a Three Degree-of-Freedom Force Output Joystick," Department of Mechanical Engineering, May 11, 1990, pp. 9-40 & 96 & 97.

Schmult, Brian et al., "Application Areas for a Force-Feedback Joystick," ASME 1993, DSC—vol. 49, pp. 47-54.

Su, S. Augustine et al., "The Virtual Panel Architecture: A 3D Gesture Framework," IEEE 0-7803-1363-1, 1993.

Tan, Hong Z. et al., "Human Factors for the Design of Force-Reflecting Haptic Interfaces," Tan, Srinivasan, Eberman, & Chang, ASME WAM 1994, pp. 1-11.

Tavkhelidze, D.S. et al., "Kinematic Analysis of Five-Link Spherical Mechanisms," Mechanism and Machine Theory, Pergamon Press, 1974, vol. 9, pp. 181-190.

Wiker, Steven F. et al., "Development of Tactile Mice for Blind Access to Computers: Importance of Stimulation Locus, Object Size, and Vibrotactile Display Resolution," Proc. of the Human Factors Society 1991, pp. 708-712.

Yamakita, M. et al., Tele-Virtual Reality of Dynamic Mechanical Model, IEEE Jul. 7-10, 1992, pp. 1103-1110.

Hasser, C., "Tactile Feedback for a Force-Reflecting Haptic Display" Thesis, School of Engineering, University of Dayton, pp. 1-98, 1995.

Hirota, Koichi et al., "Development of Surface Display," IEEE 0-7803-1363-1, 1993, pp. 256-262.

Brooks, F. et al., "Project GROPE—Haptic Displays for Scientific Visualization," Computer Graphics, vol. 24, No. 4, 1990, pp. 177-185.

Millman, P. et al., "Design of a Four Degree-of-Freedom Force-Reflecting Manipulandum with a Specified Force/Torque Workspace," IEEE CH2969-4, 1991, pp. 1488-1492.

Kelley, A.J. et al., "MagicMouse: Tactile and Kinesthetic Feedback in the Human-Computer Interface using an Electromagnetically Actuated Input/Output Device," Dept. of Elec. Engineering, Univ. of British Columbia, 1993, pp. 1-27.

Akamatsu, M., "Multimodal Mouse: A Mouse-Type Device with Tactile and Force Display", Presence, vol. 3, No. 1, Winter 1994, pp. 73-80.

Bostrom, M. et al., "Design of An Interactive Lumbar Puncture Simulator With Tactile Feedback," IEEE, 0-7803-1363-1, 1993, pp. 280-286.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC—vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC—vol. 42, *Advancs in Robotics*, pp. 55-61, ASME 1992.

Russo, "Controlling Dissipative Magnetic Particle Brakes in Force Reflective Devices," DSC—vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation", *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games", *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

SCANNELL, "Taking a Joystick Ride," Computer Currents, Boston Edition, vol. 9, No. 11, Nov. 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

"3D Human Interface Tool," Immersion Probe. TM., Immersion Human Interface Corporation 1994.

"Call it Palpable Progress," Science & Technology, Business Week, Oct. 9, 1995, p. 93.

"Cursor Waldo", Designer's Corner, Useful Technology for Your Idea Life, Design News, Mar. 7, 1994, p. 63.

"Foot-Operated Mouse," IBM Technical Disclosure Bulletin, Apr. 1986, vol. 28, No. 11.

"High Performance Model of the Immersion Probe," Immersion Probe.TM., Immersion Human Interface Corporation.

"Proceedings of the IFIP Congress 65" International Federation for Information Processing, Information Processing 1965, vol. 3, New York, May 24-29, 1965, p. 506.

"The Personal Digitizer.TM.," Immersion Human Interface Corporation, 1994.

"Useful Technology for Your Idea File," Design News, Mar. 7, 1994, p. 63.

Fischer, Patrick et al., "Specification and Design of Input Devices for Teleoperation," 1990.

Fisher, S.S. et al., "Virtual Environment Display System," ACM 1986 Workshop on Interactive 3D Graphics, Oct. 1986.

Herndon, J.N. et al., "The State-of-the-Art Model M-2 Maintenance System," Proceedings of the 1984 National Topical Meeting on Robotics and Remote Handling in Hostile Environments, American Nuclear Society, pp. 59-65.

Iwata Hiroo et al, Volume Haptization, IEEE 1993, pp. 16-18.

Iwata, Hiroo, "Pen-based Haptic Virtual Environment," Institute of Engineering Mechanics, University of Tsukuba, Japan, pp. 287-292.

Jones, L.A. et al., "A Perceptual Analysis of Stiffness," Experimental Brain Research, Springer-Vertag 1990, pp. 151-156.

Kim, Won S. et al., "Graphics Displays for Operator Aid in Telemanipulation," IEEE 1991, pp. 1059-1067.

Krueger, Myron W., Artificial Reality 1988, pp. 54-75.

Meyer, Kenneth et al., "A Survey of Position Trackers," Presence, vol. 1, No. 2, Spring 1992, pp. 173-200.

Noll, A. Michael, "Man-Machine Tactile Communication Dissertation," Polytechnic Institute Brooklyn, Jun. 1971, pp. 1-88.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis B., "The Use of Virtual Fixtures to Enhance Operator Performance in Time Delayed Teleoperation," Crew Systems Directorate Biodynamics and Biocommunications Division Wright-Patterson, Air Force Material Command, Mar. 1993, pp. 1-45.

Smith, Geoffrey, "Call It Palpable Progress," Business Week, Oct. 9, 1995. pp. 93, 96.

Snow, E. et al., "Compact Force-Reflecting Hand Controller," JPL, Apr. 1991, vol. 15, No. 3, Item No. 153, pp. 1-15a.

Tan, Hong Z et al., "Manual Resolution of Compliance When Work and Force Cues are Minimized," ASME 1993, DSC-vol. 49, pp. 99-104.

Brooks, F. et al., "Project GROPE-Haptic Displays for Scientific Visualization," Computer Graphics, vol. 24, No. 4, 1990, pp. 177-185.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by the Hand: System Description and Some Results," DSC-vol.55-1, *Dynamic Systems and Control*: vol.1, ASME 1994.

Gobel et al., "Tactile Feedback Applied to Computer Mice," *International Journal of Human-Computer Interaction*, vol. 7, No.1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics* '95, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.iblblio.org/GameBytes/Issue21/greviews/cyberman.html, 1994.

Balgrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-Jan. 1993 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation-A State-of-the-Art Technology Survey and Evaluation," *JPL Publication 85-11*, NASA-CR-175890; N85-28559 pp. 1-84, Mar. 1, 1985.

Jones et al., "A perceptual analysis of stiffness," ISSN 0014-4819 Springer International (Springer-Vertag); *Experimental Brain Research*, vol. 79, No. 1, pp.150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851: JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein el al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of a Non-reactive, Fingertip, Tactile Display for Interaction with Remote Environments," *Cooperative Intelligent Robotics in Space*, Rui J. deFiguelredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30- Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR-A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory Intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Scannell, "Taking a Joystick Ride," Computer Currents, Boston Edition, vol. 9, No. 11, Nov. 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

\* cited by examiner

FORCE FEEDBACK DEVICES USING FLUID BRAKING

CROSS REFERENCE TO RELATED APPLICATIONS

This application is a continuation-in-part of the following applications:

U.S. patent application Ser. No. 09/028,082, now U.S. Pat. No. 6,486,872, filed Feb. 23, 1998, which is a continuation of U.S. patent application Ser. No. 08/489,068, now U.S. Pat. No. 5,721,566, filed Jun. 9, 1995, and U.S. patent application Ser. No. 08/965,720, filed Nov. 7, 1997, now U.S. Pat. No. 6,166,723 each of which are incorporated by reference in their entirety. This application also claims priority to U.S. Provisional Application No. 60/128,975, filed Apr. 12, 1999 on behalf of L. Rosenberg; which is incorporated herein by reference in its entirety.

BACKGROUND OF THE INVENTION

The present invention relates generally to the interfacing with computer devices by a user, and more particularly to devices used to provide input to computer systems and which provide force feedback to the user.

Humans interface with electronic devices in a variety of applications, and there is a constant need for a more natural, easy-to-use, and versatile interface device. One of those applications includes interacting directly with computer-generated environments. Interface devices are used extensively with computer systems in the implementation of computer-controlled games, simulations, and other applications very popular with the mass market of home consumers. In a typical implementation, a computer system such as a personal computer, home video game console, portable computer, stand-up arcade machine, etc., displays a graphical environment to a user on a display device. Users can interact with the displayed environment by inputting commands or data from the interface device. Popular interface devices include joysticks, "gamepad" button controllers, mice, trackballs, styluses, tablets, steering wheels, pressure spheres, foot or hand pedals, or the like, that are connected to the computer system controlling the displayed environment. The computer updates the environment in response to input signals from the interface device based on the user's manipulation of a moved manipulandum such as a joystick handle, wheel, or mouse. The computer provides visual feedback to the user using the display screen.

In some interface devices, tactile and/or kinesthetic feedback is also provided to the user, more generally known as "haptic feedback" herein. These types of interface devices can provide physical sensations to the user manipulating the physical object of the interface device. Typically, motors or other actuators of the interface device are coupled to the manipulandum and are connected to the controlling computer system. The computer system receives sensor signals from the interface device and sends appropriate force feedback control signals to the actuators in conjunction with host events. The actuators then provide forces on the manipulandum. The computer system can thus convey physical sensations to the user in conjunction with other visual and auditory feedback as the user is contacting the manipulandum. Commercially available force feedback devices include the Wingman Force joystick and Wingman Formula Force steering wheel from Logitech, Inc., and the Sidewinder Force Feedback Pro joystick from Microsoft Corporation.

Many types of actuators for generating computer-controlled forces are known, including DC and stepper motors, voice coils, hydraulic actuators, and pneumatic actuators. Some devices are active, such as motors, which means that the device provides an active force that has the ability to move an object or push back on the user. Other actuators are passive, such as brakes, which provide a resistance to motion generated by another source (such as the user) and cannot generate forces on their own. An advantage of active devices is their ability to simulate all kinds of force sensations. However, disadvantages of active actuators include instability: the actuators can settle into a feedback loop in which oscillating forces are output on the manipulandum, for example. Other disadvantages of active actuators include a high cost, and large size and weight. Passive actuators, on the other hand, while not able to output all the types of force sensations of active actuators, can provide relatively high magnitude forces and are inherently stable and safe, and are typically of low cost and weight. However, standard passive actuators can still be expensive for lower-cost devices and can still add significant weight to an interface device.

SUMMARY OF THE INVENTION

The present invention provides a number of embodiments for a force feedback interface device that uses an efficient and small-sized fluid viscosity-controlled brake that outputs high forces at low cost while maintaining inherent safety.

More particularly, an interface device of the present invention is manipulated by a user and provides input signals to a host computer. The device includes a manipulandum physically contacted by the user and moveable in at least one degree of freedom. A sensor, such as a rotary optical encoder or analog potentiometer, senses a position of the manipulandum in the degree of freedom and outputs a sensor signal, where a representation of the sensor signal is provided to the host computer. The interface device also includes a fluid-controlled brake including a fluid having a viscosity that can be controlled by controlling an electric current, wherein a resistive force or drag on the manipulandum is controlled by controlling a viscosity of the fluid. In one preferred embodiment, the resistive force is controlled by adjusting a degree of contact of the brake with the manipulandum based on the fluid's viscosity. The fluid can be a magnetorheological fluid having a viscosity controlled by a magnetic field provided by current in a coil, or an electorheological fluid having a viscosity controlled by an electric field.

Several embodiments of the invention can be implemented. For example, a magnetorheological fluid can be suspended in a sponge, such as available from Lord Corporation, which includes an absorbent matrix material, allowing different resistances to be controlled. The sponge can contact a surface that is coupled to the manipulandum, where the surface can be part of a disk or plate. Other embodiments may provide pistons in the fluid. The manipulandum can be moved in rotary or linear degrees of freedom such that the brake can be a rotary or linear brake. The brake can also include a U-shaped member, where an element is coupled to a prong of the U-shaped member and the coil is wound about a central portion of the U-shaped member. Multiple sponges or other such elements can be provided for increased resistive control.

The host computer preferably runs a graphical simulation or game that is influenced by the movement of the manipulandum by the user. In one embodiment, the simulation portrays a fishing activity, and the manipulandum includes a crank arm of a fishing reel, the fishing reel coupled to at least a portion of a fishing rod. Different resistances on the crank arm can simulate the catching of fish. In a different embodiment, the manipulandum includes a pedal assembly of a stationary bicycle device, where the user interacts with the computer simulation by pedaling and steering the bicycle device and resistance can be output on pedal motion to simulate riding the bicycle up and down inclines. In yet other embodiments, the manipulandum includes a rotary knob for adjusting settings of an electronic device, or includes a cylinder that can be moved in a rotary and translatory degrees of freedom for controlling a cursor. Some embodiments may further include an actuator that outputs a vibrotactile sensation on a housing of the interface device.

The present invention provides compact, low-cost, and light weight embodiments for interface devices providing braking forces to an interface device. The controlled viscosity brake used in the present invention provides high-magnitude braking forces and is well-suited to small, inexpensive haptic feedback devices, allowing the interface device of the present invention to be used in mass-produced consumer devices.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
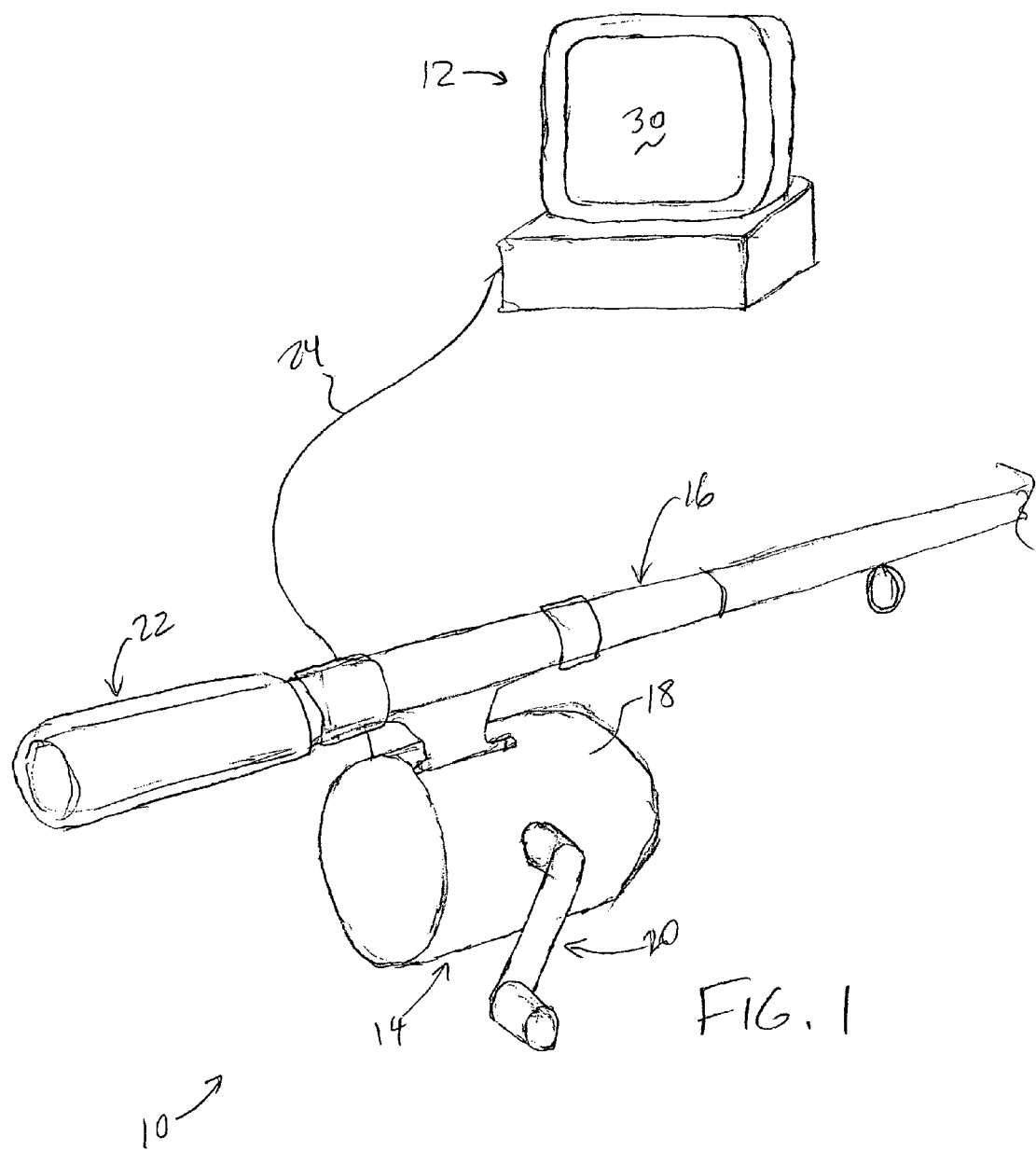
FIG. 1 is a perspective view of one embodiment of an interface device of the present invention.

FIG. 1 is a perspective view of a first embodiment of a force feedback interface device 10 of the present invention, in which a fishing game or simulator is implemented. The device 10 is used for interfacing a user with a computer generated environment implemented by a host computer 12.

Interface device 10 of the described embodiment is in the form of a fishing rod and reel, of similar shape and size to rods and reels used by fisherman, and includes a reel unit 14 and a rod 16. Reel unit 14 of the interface device 10 can be shaped and sized similarly to a reel used on a standard fishing rod, and includes a reel housing 16 and a reel crank arm 18. Reel housing 16 encloses mechanisms for reading the position of the reel crank 18 and providing haptic feedback on the reel crank 18, as described in greater detail below with respect to FIG. 2. Reel crank arm 18 can be rotated by the user in a rotary degree of freedom similar to a crank arm on a standard fishing reel. A sensor signal is preferably provided to the host computer 14 on a bus 24 indicative of the position (and/or velocity, acceleration) of the crank arm 20 in its degree of freedom.

Rod 16 is a generally cylindrically-shaped member that includes a grip 22 on one end and which is coupled to the reel unit 14. Rod 16 can be coupled to the reel unit 14 with standard couplings similar to those used on standard fishing rods, or by some coupling specific to the device 10. The rod 16 is preferably not a full-length fishing rod due to the unwieldiness of such a long device, but is instead a portion of a full-length rod (some embodiments can include a full length rod). Weights can be distributed in the rod as necessary to simulate the weight and motion of a full length rod. In other embodiments, differently-shaped reel units 14, rods 16, crank arm 20, and other components can be used. In addition, the rod 16 can be made to pass through apertures in the housing 18 of the reel unit 14 in some embodiments. Furthermore, some embodiments can include one or more buttons or similar controls (dials, knobs, direction pads, sliders, trackballs, etc.) provided on the surface of reel unit 14 and/or rod 16 that can provide input signals to the host computer 14.

Additional sensors and actuators can be included in the device 10 in other embodiments. For example, one or more gyroscopes, accelerometers, visual sensors, or other types of sensors well known to those skilled in the art can be provided to detect the angle and/or motion of the entire device 10 as it is being moved around by the user in a fishing simulation. With such sensors, the host computer 12 can track the position and orientation of the device 10 with respect to a ground, and can orient a virtual fishing rod and/or hook in response to the determined position and orientation. In addition, other actuators can be provided to output other types of force sensations to the user in addition to the haptic feedback output on the crank arm 20. For example, an actuator such as a motor can be provided to drive an inertial mass and output inertial forces on the device 10. The inertial mass can be oscillated or rotated to provide oscillations, pulses, or textures on the rod 16 and reel unit 14 and therefore to the user. In some embodiments, an eccentric mass can be rotated by a rotary actuator to provide forces. Some methods of controlling such an actuator for providing different force sensations is described in copending U.S. provisional application No. 60/156,354, incorporated herein by reference. In other embodiments, a mass can be moved linearly in a particular direction by a linear or rotary actuator to provide a vibrotactile sensation. An example of such an actuator is described in copending provisional application No. 60/172,953, incorporated herein by references. Such forces can be used to provide tugs and jolts from a simulated fish caught within a game or simulation. For example, a pulse or vibration in the up-down direction might simulate the fishing pole being bent and tugged by a fish in that direction.

Interface device 10 is coupled to host computer 12 by a bus 24, which can be any of several types of communication media. For example, a serial interface bus, parallel interface bus, or wireless communication link (e.g., infrared, radio frequency, etc.) can be used. Specific implementations can include Universal Serial Bus (USB), IEEE 1394 (Firewire), RS-232, or other standards.

Host computer 12 is preferably a personal computer, workstation, video game console, or other computing or electronic device. Personal computers, such as an IBM-compatible or Macintosh personal computer, or a workstation, such as a SUN or Silicon Graphics workstation, can be used. Alternatively, one of a variety of home video game systems, such as systems available from Nintendo, Sega, or Sony, a television "set top box" or a "network computer", etc. can be used. Or, the host 12 and device 10 can be included in a single housing in an arcade game machine, portable computer, or other device. Host computer system 12 preferably implements a host application program with which a user is interacting via peripherals and interface device 10. For example, the host application program can be a video or computer game, medical simulation, scientific analysis program, operating system, graphical user interface, or other application program.

The host application preferably displays graphical images of the environment on a display device included with the host computer, such as a display screen 30, a television, 3D display goggles, LCD display, etc. The software and environment running on the host computer 12 may be of a wide variety. For example, the host application program can be a video game, simulation, graphical user interface (GUI), Web page or browser that implements HTML or VRML instructions, scientific analysis program, virtual reality training program or application, or other application program that utilizes input from the interface device 10 and outputs force feedback commands to the device 10. For example, many game application programs include force feedback functionality and may communicate with the force feedback interface device 10 using standard force feedback protocols/drivers such as the Immersion API available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated view of a controlled character might be considered a graphical object.

In operation, the controls of interface device 10 are manipulated by the user, which indicates to the computer how to update the implemented application program(s). An electronic interface can be included in housing 18 of device 10 and can couple the device 10 to the computer 12. The host computer 12 receives the input from the interface device and updates an application program in response to the input. For example, a game presents a graphical environment in which the user controls one or more graphical objects or entities using the device 10 and other controls such as buttons. In force feedback embodiments, the host computer provides force feedback commands and data to the device 10 to cause force feedback to be output on crank arm 20 and/or other controls.

In the described embodiment, the host application is preferably a fishing game or simulation in which the user controls a fishing character or a hook that is directed out into water and used to reel in fish caught within the game or simulation. The user grasps the device 10 with one hand at grip 22 and the other hand grasping the rotational handle of the crank arm 20. The force feedback output on crank arm 20 allows the simulation of a fish caught on a fishing line, where the crank arm 20 is more difficult to move due to the fish tugging at the other end of the simulated fishing line.

Figure 2:
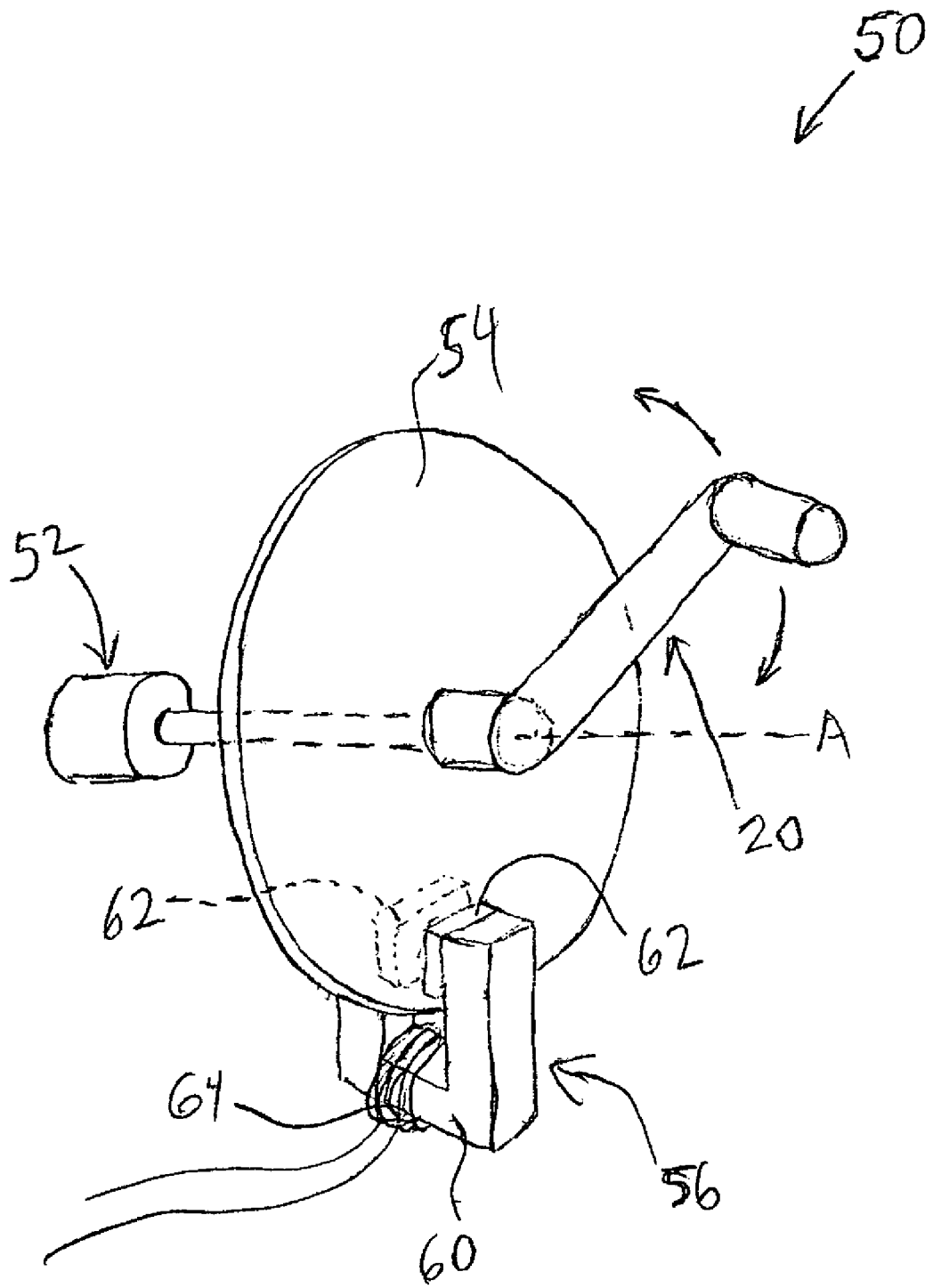
FIG. 2 is a perspective view of a mechanical system suitable for use with the interface device of FIG. 1.

FIG. 2 is a perspective view of a mechanism 50 for use with the fishing reel embodiment of the interface device 10 of the present invention. Mechanism 50 is coupled to the crank arm 20 and includes a sensor 52, a disk 54, and a braking mechanism 56.

Sensor 52 is coupled to the crank arm 20 by a rotary shaft 53 in the embodiment shown in FIG. 2. Sensor 52 can be a digital optical encoder, analog potentiometer, or other sensing device. The sensor 52 detects the position of the crank arm 20 in its rotational degree of freedom (about axis A) and relays signals to host computer 12 or to a different controller that include information indicative of the sensed position of the crank arm. Sensor 52 can be an absolute or relative sensor. In other embodiments, various other types of sensors can be used, including non-contact sensors such as optical sensors having an emitter and a detector, magnetic sensors, etc. Velocity and/or acceleration sensors may also be used. When a user rotates the crank arm 20, the computer can track the motion and uses that motion to simulate the fishing rod action, such as the position in a graphical environment of a simulated hook on a simulated fishing line.

Forces are applied to the crank arm 20 using the components including disk 54 and braking mechanism 56. Disk 54 is made of a magnetically permeable material such as a suitable metal plate or the like having a engagement surface and is rigidly coupled to the crank arm 20 at approximately the center of the disk so that the disk 54 rotates about axis A as the crank arm is rotated. Braking mechanism 56 includes a U-shaped support that is oriented such that the disk 54 may be rotated between the prongs of the U shaped support. The disk 54 and the U-shaped support are made of a material that can provide a flux path for a magnetic field produced by the braking mechanism, such as iron.

In the embodiment shown, a magnetorheological "sponge" 62 is coupled to each of the two prongs of the U-shaped member 60 such that each sponge contacts the surface of the disk 54. A magnetorheological sponge allows magnetorheological fluid to be used in a braking device or method. Magnetorheological fluid is a fluid that has a viscosity that can be changed by a magnetic field. By applying the magnetic field at different strengths, different viscosities are produced. Each sponge 62 includes an absorbent matrix material which holds the magnetorheological fluid. When a magnetic field is applied to the sponge, the magnetorheological fluid suspended in the sponge changes its viscosity and the disk 54 contacting the sponge encounters greater or less resistance, depending on whether viscosity has increased or decreased, respectively. A magnetorheological sponge suitable for use with the present invention is available from Lord Corporation of Cary, N.C. Other elements besides sponges can also be used which can suspend a fluid and/or provide varying degrees of resistance on a surface (such as the surface of disk 54) based on the viscosity of the fluid.

A coil 64 of wire is wound at the base portion of the U-shaped support 60. When an electric current is flowed through the coil 64, a magnetic field is generated; the magnetic field extends through the sponges 62 and changes the viscosity of the magnetorheological fluid suspended in the sponges. This creates more drag between the disk 54 and the sponges 62, thus creating more force resistance in the rotary degree of freedom of the disk 54. The resistance can be increased or decreased by adjusting the current in the coil. In some embodiments, a single magnetorheological sponge can be provided on only one side of the support 60 to contact the disk 54 on only one of its sides. In still other embodiments, other-shaped supports can be used and other flat members instead of a circular-shaped disk.

Magnetorheological braking devices achieve high force for low component cost. In addition, these devices can be very low power, thereby allowing for further reduction in system cost. In addition, these devices, like all braking devices, are inherently stable, thereby allowing for reduced cost on control electronics/processor electronics. In addition, these devices are light weight.

In other embodiments, a linear magnetorheological brake can be implemented by providing a plate similar to the disk 54 and coupling a magnetorheological sponge to a linearly-moving member. The sponge is put in contact with the plate and resistance on the linearly-moving member can be controlled similarly as described above for the rotary brake. In still other embodiments, magnetorheological fluid can be forced through valves or other channels similar to hydraulic devices and its viscosity controlled to resist motion of a piston or other member through the fluid in varying degrees. Some embodiments using valves and pistons that can be used with the present invention are described in U.S. Pat. No. 5,721,566, which is incorporated herein by reference.

In other embodiments, other types of fluids having a controllable viscosity can be used. For example, an electrorheological fluid can be used instead of the magnetorheological fluid discussed above, where the fluid's viscosity is controlled with an electric field instead of a magnetic field. The electric field can be produced between parallel plates having a voltage potential, similar to a capacitor used in electronic circuits. A sponge or other element that is positioned in the electric field and frictionally engages a surface can include an eletrorheological fluid and control its degree of contact with the surface, similarly to the magnetorheological sponge described above. Some other embodiments of a fluid-controlled brake using an electrorheological fluid are described in U.S. Pat. No. 5,721,566 and can be used in the present invention. For example, the crank arm 20 can be rotatably coupled to a piston in a cylinder including such a fluid, where the resistance on the crank arm is determined by the resistance on the piston moving through the fluid.

In the intended operation of the fishing embodiment of FIG. 1, the braking mechanism 56 simulates a drag on the reel of the fishing device when a fish is caught in a computer-implemented fishing simulation or game. When a fish is caught, the computer (or other control processor) can command "drag" upon the crank arm 20 by causing the magnetorheological brake to activate to cause the fluid viscosity to increase. If a small fish is caught, the computer can cause a low voltage to be applied to the brake, thereby applying a small drag force to the crank arm. A large fish can result in a high voltage, to cause a large drag force to be applied to the crank arm. The various movements of the fish can be simulated by varying the drag on the crank arm while the user is rotating it.

Braking devices typically hold or resist a moveable object in both directions within a degree of freedom. In some devices, there can be a problem simulating walls or obstruction forces with passive actuators such as brakes due to the difficulty of detecting motion in an opposite direction to the obstruction while the object is being held by the brake. However, since a reel crank arm is only rotated in one direction by a user in normal use during fishing, rotation in the opposite direction need not be sensed, and this problem is bypassed. In other embodiments where bi-directional rotation needs to be sensed, a desired amount of play can be introduced between the sensor and the manipulandum to allow sensing of motion during braking forces for a uni-directional obstruction. Embodiments of such desired play are described in U.S. Pat. No. 5,767,839, incorporated herein by reference.

Furthermore, a local microprocessor (or other local processing device) can be coupled between the host computer and the reel mechanism to locally control braking forces. Embodiments including such a local microprocessor are described below with reference to FIG. 6. Or, a direct host computer control method can be used, where no local microprocessor is used. Preferably, the product runs off a USB or similar communication link. In the ideal embodiment, all power used to drive the magnetorheological brake is drawn from the USB port or similar interface, or can be drawn from batteries on the fishing device 10. What is advantageous of this method over using a motor is that the magnetorheological actuator is light weight, low cost, and low power. That means that the fishing rod interface device can be low cost, feels light to the user, and can run off USB power (not needing an additional external power supply).

One limitation of the magnetorheological braking described above is that it cannot simulate the active feel of a live fish (like the jolt of a catch or the vibration of a fish struggling at the end of the fishing line). To add this capability, a low cost vibrotactile actuator in combination with the brake can be provided on the fishing rod device, as mentioned above. The vibrotactile actuator can be an inertial vibrotactile actuator such as a motor with an eccentric weight or a linear motor with a moving mass. The vibrotactile actuator can be positioned, for example, directly in the housing 18 of the reel unit 14. The rod device can be a full fishing rod, or it can be a smaller device, e.g. just the reel portion and grip portion of the rod. Such a system would allow for very large resistance forces on the crank arm 20 and small vibration forces when a fish is caught or a snag is encountered.

Figure 3:
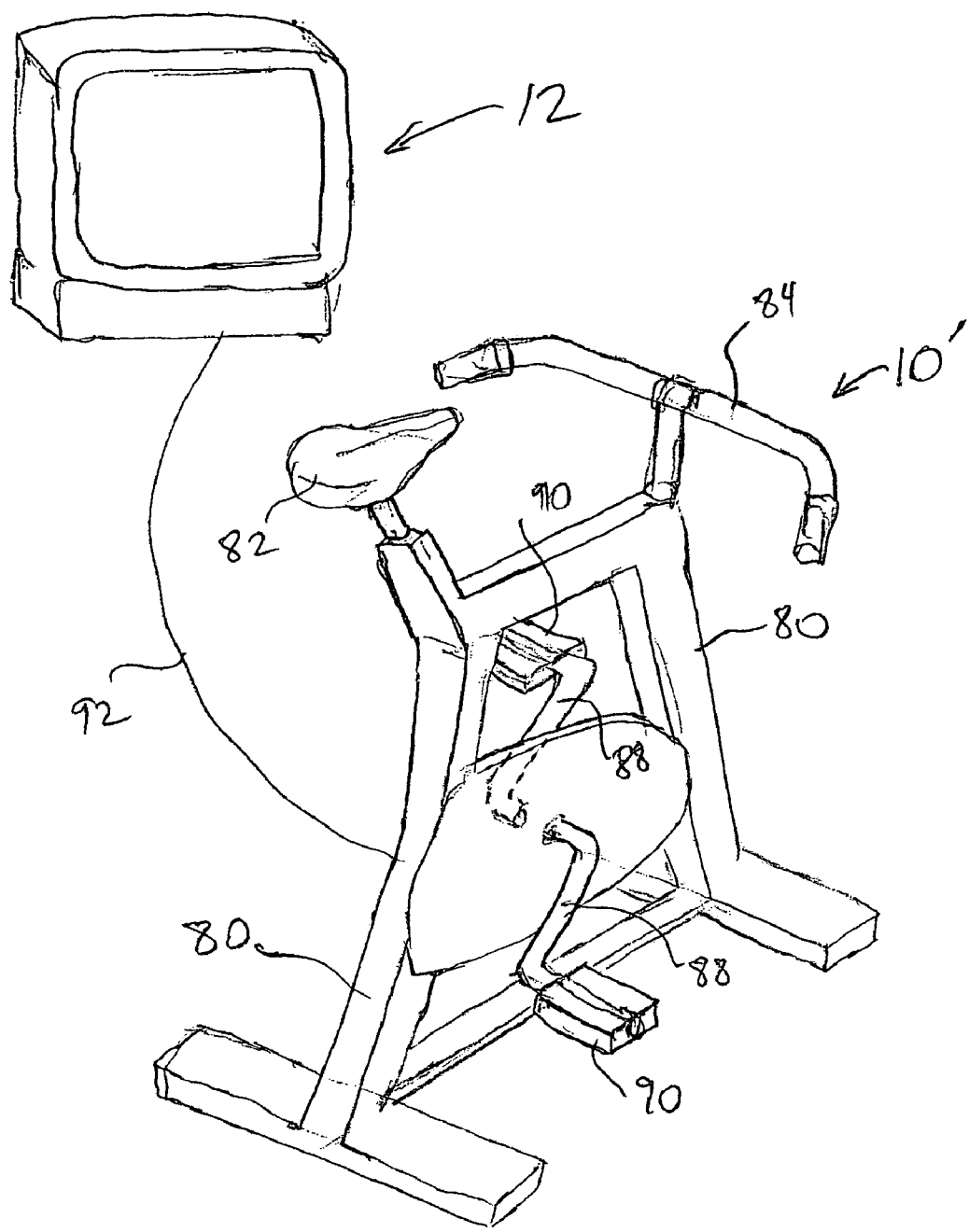
FIG. 3 is a perspective view of a second embodiment of an interface device of the present invention.

FIG. 3 is a perspective view of a second embodiment of the present invention. Interface device 10' is a bicycle simulation device that can be used to simulate riding a bicycle, similar to a bicycle exercise machine or the like. A stationary frame 80 rests on a ground surface and provides a structure of a similar height to a bicycle. A seat 82 is coupled to the frame on which the user sits during operation of the device 10'. Handlebars 84 are rotatably coupled to the frame 80 and are grasped by the user's hands during operation of the device and may be rotated to simulate turning the bicycle. Pedal assembly 86 is rotatably coupled to the frame 80 and supports the user's feet during operation. The pedal assembly 86 includes pedal arms 88 and pedals 90, each pedal 90 rotatably coupled to an associated pedal arm 88. The pedal arms 88 are preferably rigidly coupled to each other, where the second pedal arm is oriented 180 degrees from the first pedal arm. The pedal arms 88 can be rotated in a rotary degree of freedom by the user's legs and feet. Other embodiments can include other components, such as one or more wheels which are rotated in place by the pedals to provide an authentic feel. A host computer 12 is coupled to the bicycle device 10' by a bus 92 (or by wireless communication) and includes a display device. The host computer can run a graphical simulation or game so that the user of the device 10' can interact with the simulation. Other embodiments may include the display device of the host computer 12 (or a display device connected to a local microprocessor) provided on the handlebars 84 for easy viewing by the user.

Bicycle device 10' preferably includes a number of transducers to interface with the host computer 12. A mechanism similar to that shown in FIG. 2 is preferably used to provide drag or resistance on the pedal arms 88 of bicycle simulation device 10'. For example, the pedal arm 88 can be the crank arm 20 described for FIG. 2. Disk 54 can be positioned between the pedal arms 88. The other components shown in FIG. 2 can also be included in the bicycle embodiment to provide sensing and drag on the pedals in their rotary degree of freedom. The pedal motion can be sensed at the pedal itself (e.g., sensor 52 can be directly coupled to a shaft of the pedal arms 88) or further down in the mechanism chain (e.g., after a mechanical transmission such as a gear drive, belt drive, or capstan drive). Preferably, a magnetorheological fluid device similar to that described with reference to FIG. 2 is used to exert resistance on the pedal arms. The resistance can also be applied after being amplified or reduced by a mechanical transmission system, such as a belt drive, capstan drive, or gear assembly, positioned between the brake and the grip, pedal, or handle.

To complete the realism of the simulator, other sensors and actuators can be provided for other functions and effects of the bicycle. For example, a sensor coupled to the handlebars 84 preferably detects the position of the handlebars in their rotary degree of freedom. Additional sensors can be used to measure the position of a gear selector and the position of hand brakes (if present) of the bicycle device. Buttons or other extra controls can also be provided in some embodiments, e.g. for use in a video game.

During operation, the handlebar sensor(s) indicate to the host computer where the user is steering the bicycle within the game or simulation. When the user rotates the pedal arms (similar to rotating crank arm 20 about axis A), the host computer 14 can track the motion and uses that motion to simulate the motion of the simulated bicycle in the game or simulated environment. The system also may generate force resistance on the pedals. For example, the drag on the pedals can be increased when the user is peddling up an incline in the simulation to simulate the increased effort required to move the bicycle in such a situation. When the bicycle is moving down a simulated hill, the drag can be decreased. This can be used for realistic video game applications where a user is peddling and watching the course, road, track, etc. go by on the display device.

When the user steers the bicycle to move up a hill, the computer or processor can command "drag" upon the pedals by causing the magnetorheological brake to activate. A small hill might result in a low voltage on the brake, thereby applying a small drag force. A large hill might result in a high voltage, thereby providing a large drag force. Since the pedal is only rotated in one direction by the user, the typical limitations of force feedback braking related to rapid direction changes of the user manipulatable object are not present. A local processor can be provided between the host computer and the pedal mechanism, or direct computer control can be used as explained above.

As with the fishing embodiment described above, this embodiment is low cost, achieves very high forces, and is inherently safe. One limitation of the magnetorheological brake is that it cannot realistically simulate the active vibration feel of going over a bump or a rough road. In some embodiments, this vibration can be simulated using a vibrotactile actuator, e.g. the actuator can be coupled to the bicycle seat 82 on which the user is sitting. As described above, the vibrotactile actuator can be an inertial vibrotactile actuator such as a motor with an eccentric weight or a linear motor with a linearly-moving mass. Such a complete system would allow for very large forces on the pedals and small vibration forces on the seat.

A single local processor can be located on the stationary bicycle, its function being to read the sensor that measures pedal motion, read the sensor that measures handle bar angle or motion, read the sensors that indicate choice of gear, and read the sensors that measure the state of the hand brake(s). All of these sensor values can be sent back to the host computer via communication bus 92. In addition, the local processor can receive commands or data back from the host computer indicating the amount of drag to be applied to the pedals based upon the terrain in the computer-generated environment.

In some embodiments, the host computer can be networked to other host computers over a network such as a LAN or the Internet, such that a distributed biking simulation can allow players to compete. For example, data about the course layout as well as the terrain characteristics can be downloaded over the Internet, including incline data used by the host computer to control the drag feel. Also, data about road conditions (bumpiness of feel) can be downloaded from the Internet. A server can keep track of the simulated race, allowing players from distant locations to compete and be timed against each other. Each local processor and/or host application program can have a unique ID number that is transmitted to the host and then back to the server so that every simulated bike in the race can be uniquely identified. By this method, hundred or thousands of racers can compete at once upon the same course while feeling the same terrain. To allow players to compete for cash prices without worry that a competitor has disabled the drag function on their stationary bike or has doctored the pedaling means in some way, the local processor and/or software can also report a self diagnostic status signal to the host which gets relayed to the server, indicating normal functioning (or no tampering).

Figure 4A:
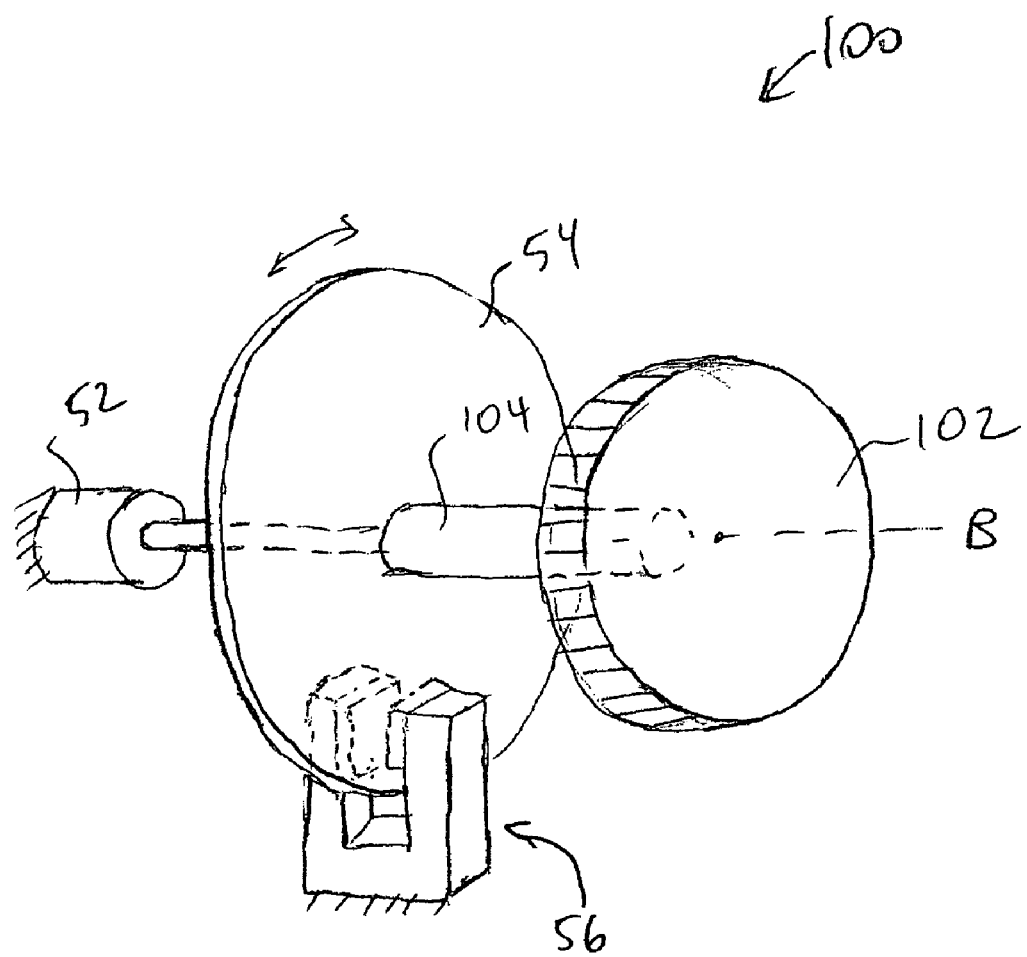
FIG. 4a is a perspective view of a third embodiment of an interface device of the present invention.

FIG. 4*a* is a perspective view of a mechanism 100 similar to the mechanism 50 of FIG. 2. Mechanism 100 can be used to provide haptic feedback to a knob or other rotational user object. Sensor 52, disk 54, and brake assembly 56 all preferably operate similarly as described above with reference to FIG. 2. A knob 102 is rigidly coupled to a shaft 104 which is rigidly coupled to the shaft of the rotational sensor 52. The user may rotate the knob 102 using his or her hand or fingers. This rotation is sensed by sensor 52 and relayed to a processor or host computer 12, and force feedback can be output in the rotational degree of freedom of the knob about axis B as controlled by a processor and/or host computer 12.

The force feedback knob controller using a magnetorheological brake is inherently stable, allowing for controllable damping, controllable hard stops, and controllable detents in the rotational degree of freedom of the knob. For example, hard stops can be programmed at desired locations in the range of travel of the knob using the magnetorheological brake, which can provide higher obstruction forces than many active actuators. Detents can be set at desired positions; a detent can be implemented by outputting a high resistance for a short time or for a short range of travel of the knob, giving the user a sensation of a jolt or pulse at a particular position. Damping can provide a desired resistance to rotational motion and can make selection of a value or positioning of a cursor easier for the user.

The knob can be provided on a variety of computer devices or interface devices, such as a laptop computer, a consumer electronics device such as a stereo or television, on a handheld remote control, on the dashboard of a car, etc. The knob 102 of FIG. 4*a* can be a roller wheel on a mouse, e.g. a wheel positioned at the front center position of a mouse that the user can rotate to scroll documents, make selections, etc. Such wheels typically have a frictional circumferential surface to allow the user a good grip on the wheel. Force feedback can be applied to the mouse wheel to enhance such wheel rotation. Software control and force feedback implementations for knobs and mouse wheels is described in greater detail in copending patent application Ser. No. 09/049,155, filed Mar. 26, 1998, and Ser. No.

09/179,382, filed Oct. 26, 1998, both incorporated herein by reference. The magnetorheological fluid brake is ideal for hand-held remote controls and other space-limited applications because of low power consumption and light weight, compact components. In other embodiments, linear knobs (sliders) can be provided with a linear magnetorheological brake.

One space-limited application for use with the knob 102 is a selection knob for a laptop computer to provide similar functionality to a standard mouse wheel, and additional functionality if desired. For example, a knob having a rotational axis extending perpendicularly to the laptop's top surface can be placed on the side of the laptop in easy access to user's fingers. The knob can be rotated to scroll documents, move a cursor across the screen or through a list of objects, icons, or selections, etc. Preferably, the knob can be pressed in a direction perpendicular (transverse) to the axis of rotation to provide a selection function, e.g. to select an item, icon, or link at which the cursor is currently pointing. The knob preferably is spring-loaded to rest at a normal operating position, and can be pushed in to select a mechanical switch, where the knob returns to the operating position when the user removes pressure in the pushing direction. One such knob is provided in the Vaio XG19 laptop computer from Sony Corp.

Figure 4B:
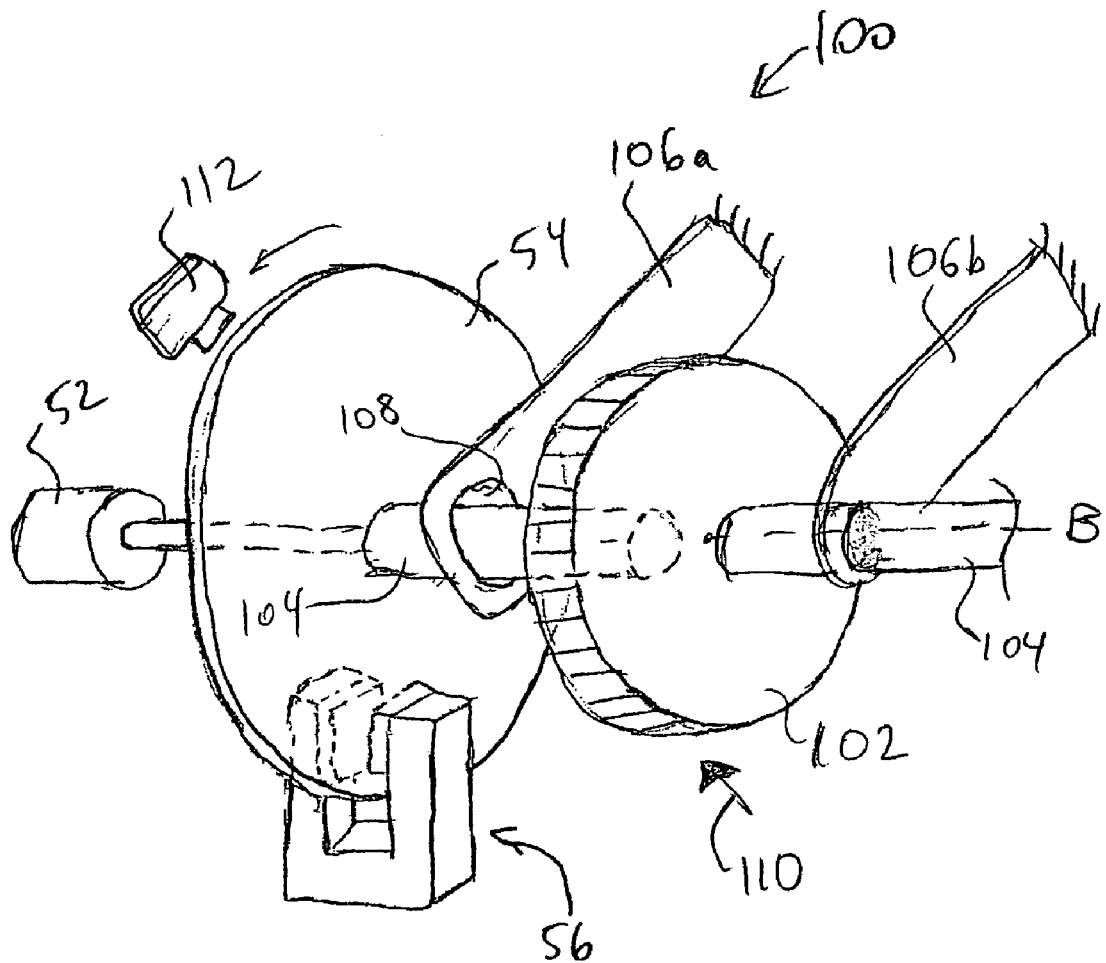
FIG. 4b is a perspective view of the third embodiment of FIG. 4a including an additional sensor.

FIG. 4b illustrates one example of the present invention including the knob described above provided with a fluid-controlled brake. The knob can be sensed and actuated in its rotary degree of freedom similar to the embodiment of FIG. 4a. In addition, the knob, shaft 104, and disc 54 can be moved in a transverse direction. Such motion can be implemented in many different ways. For example, two grounded supports 106 on either side of the knob 102 can be provided. One of the supports 106a includes a slot 108 that is larger than the size of the shaft and allows the shaft 104 and knob 102 to move or pivot within the slot 108 (the hole in the other support 106b can include a slightly larger hole to allow the pivoting motion). A mechanical spring (not shown) can be used to provide the spring bias on the knob and shaft toward an origin position. The user can thus move the knob in the transverse direction of arrow 110. A mechanical switch 112 (or other type of sensor: optical, magnetic, etc.) can be placed in the path of the disc 54 and is contacted by the edge of the disc 54 when the knob 102 is pushed in the transverse direction 110 by the user. The switch 112 thus detects the motion and outputs an appropriate signal to a processor or host computer, indicating the user has pushed the knob 102. The switch 112 can alternatively be placed at a different position around the disc 54 corresponding to a different path of transverse motion of the disc 54. The switch 112 may also detect the motion of the shaft or other component of the device.

In other embodiments, the transverse motion can be implemented in other ways. For example, a flex joint can be used to allow the shaft 104 pivot about one end of the shaft. Or, the shaft 104 can be placed in a slot in a grounded member that allows the motion in the desired transverse direction. Other mechanisms currently used in rotatable wheels for mice can also be used. In still other embodiments, the transverse motion of the knob 110 can be actuated by an actuator so that the feel of the push of the knob 102 can be made to feel differently as controlled by a microprocessor or other controller. This transverse actuator is preferably separate from the fluid brake 56, e.g. a linear actuator can be coupled between the shaft 104 and a grounded surface. In other embodiments, the knob 102 can be pushed in a direction parallel to the axis B of rotation of the knob. Some examples of such an embodiment are disclosed in copending patent application Ser. No. 09/179,382, filed Oct. 26, 1998.

Figure 5:
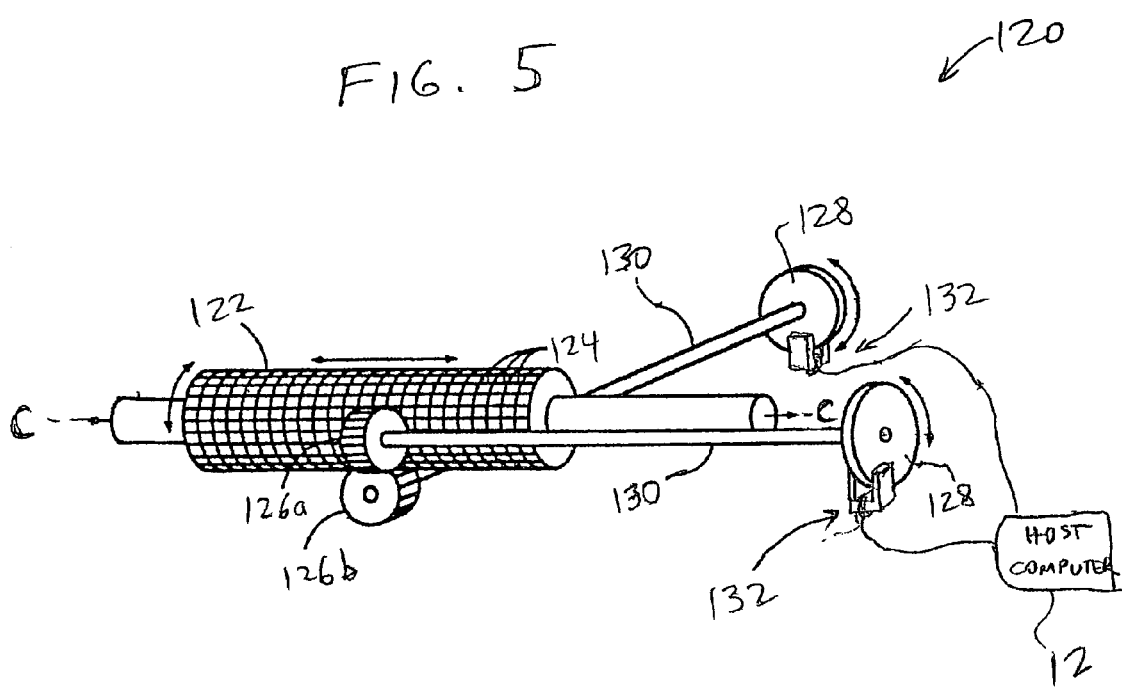
FIG. 5 is a perspective view of a fourth embodiment of an interface device of the present invention.

FIG. 5 is a perspective view of another embodiment 120 of an interface device of the present invention including a magnetorheological brake. Embodiment 120 includes a two-degree of freedom cylindrical controller that can be used to provide input control signals to a computer or other electronic device, e.g. to control the movement of a cursor in a graphical user interface displayed by a host computer 12. A cylinder 122 may be rotated about an axis C and translated parallel to the axis C by the user. The outer surface of the cylinder 122 can include annular and longitudinal grooves 124 which intersect each other. Two pinions 126 positioned at right angles with respect to each other mesh with the grooves 124 so that when the cylinder is rotated, one pinion 126a rotates, and when the cylinder is translated, the other pinion 126b rotates. A metal disk 128 is connected to each pinion 126 by a rotating shaft 130, and an magnetorheological brake 132 as described in detail in FIG. 2 provides braking resistance to the rotation of the disk 128, thereby allowing one brake 132 to provide braking resistance to the rotation of the cylinder 122 and the other brake 132 to independently provide braking resistance to the translation of the cylinder 122. Additional cylinder control device embodiments which can be used with the magnetorheological brake are described in greater detail in U.S. Pat. Nos. 5,235,868, 4,823,634, 4,712,101, and 4,724,715 and copending patent application Ser. No. 09/291,582, entitled, "Multiple-cylinder Control Device for Computers and Other Electronic Apparatus", filed concurrently herewith, all of which are incorporated herein by reference.

The magnetorheological fluid brakes allow for controllable drag during cursor control tasks. For example, two magnetorheological fluid sponge controllers can be used for the cylinder, one for the rotary axis and one for the linear axis. Alternatively, the rotary axis of the cylinder can use a rotary metal disk, and the linear axis of the cylinder can use a linear sliding metal member in place of the rotary disk, where the magnetorheological brake contacts a sponge with the linearly-moving surface of the metal member. Host computer 12 preferably controls the braking resistance, and a device microprocessor can also be used local to the device in addition to the host computer as described above.

Each axis of the cylinder can be controlled independently to control drag related to cursor motion in x and y independently. For example, a user interacting with a pull-down menu can be provided with resistance sensations when a controlled cursor in a graphical user interface moves between menu elements when using a cylinder controller fitted with a magnetorheological fluid brake. Drag can be momentarily output for other cursor interactions such as moving over a window border or window interior or moving over an icon. Drag can be output continuously when moving in force "grooves" to guide the cursor to particular areas or graphical objects displayed on the screen of the host computer. This is ideal for laptop computers because of the low power consumption and low size and weight of the magnetorheological fluid brakes. Some GUI force feedback interactions are described in copending patent application Ser. No. 08/571,606, incorporated herein by reference.

Figure 6:
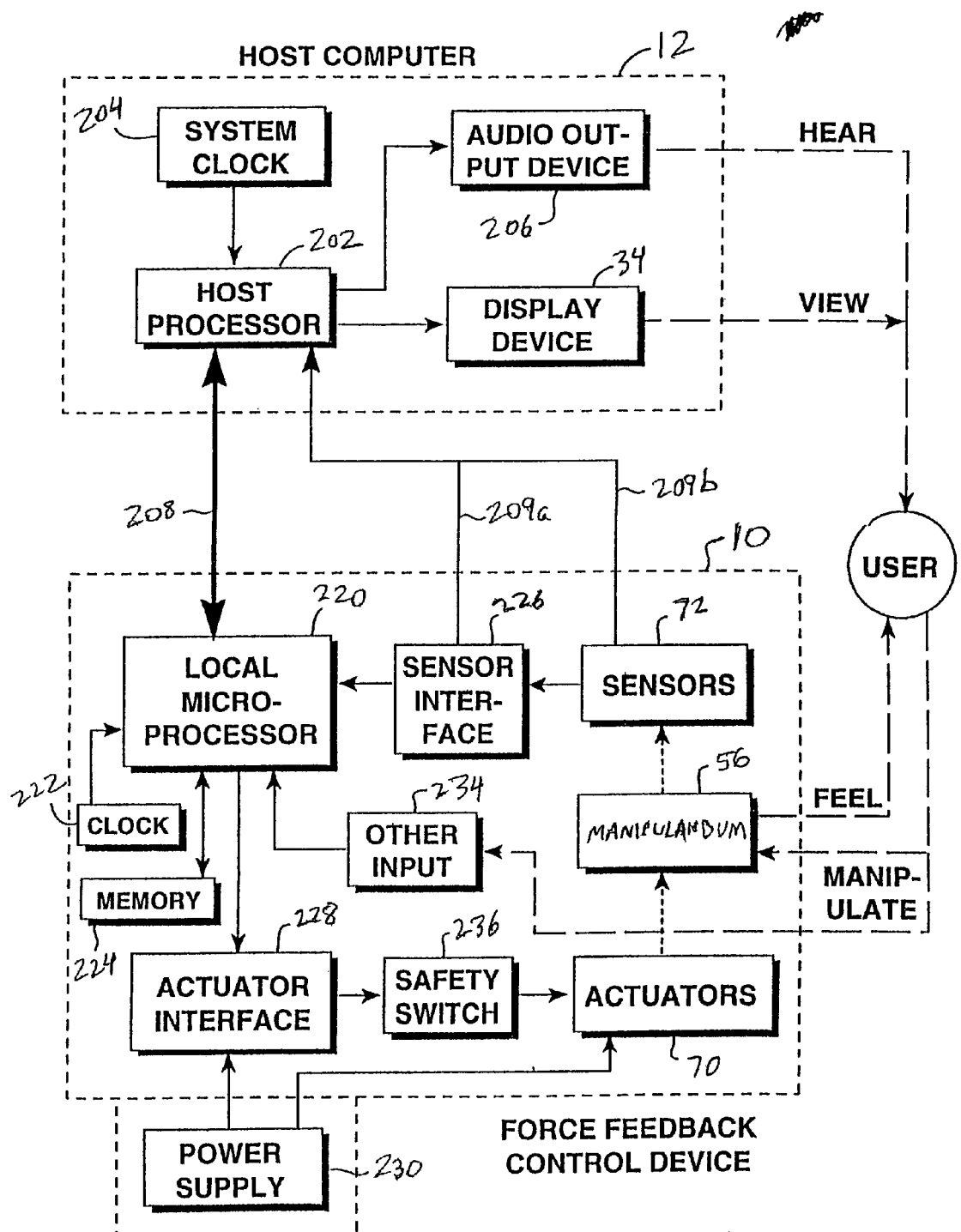
FIG. 6 is a block diagram illustrating the interface device and host computer for use with the present invention.

FIG. 6 is a block diagram illustrating a haptic feedback device 10 and host computer 14 suitable for use with the present invention. Interface device 10 can be any of the embodiments described above. A system similar to that of FIG. 6 is described in detail in U.S. Pat. No. 5,734,373 which is incorporated herein by reference in its entirety.

As explained with reference to FIG. 1, host computer 12 is preferably a personal computer, video game console, workstation, or other computing or display device. Host computer 12 commonly includes a host microprocessor 202, a clock 204, a display device 30, and an audio output device 206. Host microprocessor 202 can include a variety of available microprocessors from Intel, AMD, Motorola, or other manufacturers. Microprocessor 202 can be single microprocessor chip, or can include multiple primary and/or co-processors and preferably retrieves and stores instructions and other necessary data from random access memory (RAM) and read-only memory (ROM) as is well known to those skilled in the art. Host computer 12 can receive sensor data or a sensor signal via bus 208 from sensors of device 10 and other information. Microprocessor 202 can receive data from bus 208 using I/O electronics, and can use the I/O electronics to control other peripheral devices. Host computer system 12 can also output commands to interface device 10 via bus 208 to cause haptic feedback.

Clock 204 can be a standard clock crystal or equivalent component used by host computer 12 to provide timing to electrical signals used by host microprocessor 202 and other components of the computer 12 and can be used to provide timing information that may be necessary in determining force or position values. Display device 30 is described with reference to FIG. 1. Audio output device 206, such as speakers, can be coupled to host microprocessor 202 via amplifiers, filters, and other circuitry well known to those skilled in the art. Other types of peripherals can also be coupled to host processor 202, such as storage devices (hard disk drive, CD ROM drive, floppy disk drive, etc.), printers, and other input and output devices.

Interface device 10 is coupled to host computer 12 by bi-directional bus 208, which sends signals in either direction between host computer 12 and the interface device 10. Bus 208 can be a serial interface bus, such as USB, RS-232, or Firewire (IEEE 1394), providing data according to a serial communication protocol, a parallel bus using a parallel protocol, or other types of buses. An interface port of host computer 12, such as a USB or RS232 serial interface port, can connect bus 208 to host computer 12.

Interface device 10 can include a local microprocessor 220, local clock 222, local memory 224, sensor interface 226, and actuator interface 228. Device 10 may also include additional electronic components for communicating via standard protocols on bus 208.

Local microprocessor 220 preferably coupled to bus 208 and is considered "local" to device 10, where "local" herein refers to processor 220 being a separate microprocessor from any processors 202 in host computer 12. "Local" also preferably refers to processor 220 being dedicated to haptic feedback and sensor I/O of the device 10, and being closely coupled to sensors and actuators of the device 10, such as within a housing of the device 10. Microprocessor 220 can be provided with software instructions to wait for commands or requests from computer host 12, parse/decode the command or request, and handle/control input and output signals according to the command or request. In addition, processor 220 can operate independently of host computer 12 by reading sensor signals and calculating appropriate forces from those sensor signals, time signals, and force processes selected in accordance with a host command, and outputting appropriate control signals to the actuators. Suitable microprocessors for use as local microprocessor 220 include the Immersion Touchsense Processor from Immersion Corporation, the 8X930AX by Intel Corp., the MC68HC711E9 by Motorola, or the PIC16C74 by Microchip, for example. Microprocessor 220 can include one microprocessor chip, or multiple processors and/or co-processor chips. In other embodiments, microprocessor 220 can include digital signal processor (DSP) functionality, or control logic components or a hardware state machine can be used instead of a microprocessor.

For example, in one host-controlled embodiment that utilizes microprocessor 220, host computer 12 can provide low-level force commands over bus 208, which microprocessor 220 directly transmits to the actuators. In a different local control embodiment, host computer 12 provides high level supervisory commands to microprocessor 220 over bus 208, and microprocessor 220 manages low level force control loops to sensors and actuators in accordance with the high level commands and independently of the host computer 12. In the local control embodiment, the microprocessor 220 can process sensor signals to determine appropriate output actuator signals by following the instructions of a "force process" that may be stored in local memory 224 and includes calculation instructions, conditions, formulas, force magnitudes, or other data. The force process can command distinct force sensations, such as vibrations, textures, jolts, or even simulated interactions between displayed objects. The host can send the local processor 220 force sensation parameters to store in local memory, or can clear other force sensations to load new force sensations in memory.

A local clock 222 can be coupled to the microprocessor 220 to provide timing data, similar to system clock 204 of host computer 12; the timing data might be required, for example, to compute forces output by actuators 70. Local memory 224, such as RAM and/or ROM, is preferably coupled to microprocessor 220 to store instructions for microprocessor 220 and store temporary and other data.

Sensor interface 226 may optionally be included in device 10 to convert sensor signals to signals that can be interpreted by the microprocessor 220 and/or host computer 12. For example, sensor interface 226 can receive and convert signals from a digital sensor such as an encoder or from an analog sensor using an analog to digital converter (ADC). Such circuits, or equivalent circuits, are well known to those skilled in the art. Alternately, microprocessor 220 or host computer 12 can perform these interface functions. Actuator interface 228 can be optionally connected between the actuators of device 10 and microprocessor 220 to convert signals from microprocessor 220 into signals appropriate to drive the actuators. Interface 228 can include power amplifiers, switches, digital to analog controllers (DACs), and other components well known to those skilled in the art. Power supply 230 can optionally be coupled to actuator interface 228 and/or the actuators to provide electrical power. Alternatively, actuators and other components can draw power from the bus 208 (such as USB) from the host computer. Or, power can be stored and regulated by device 10 and used when needed to drive the actuators.

Sensors 72 sense the position, motion, and/or other characteristics of particular controls of device 10 as described above. Sensors 72 provide signals to microprocessor 220 including information representative of those characteristics. The sensor 72 or sensor interface 226 can optionally provide sensor signals directly to computer 12 as shown by busses 209a and 209b. Example of sensors suitable for embodiments described herein are digital rotary optical encoders, Hall effect sensors, linear optical encoders, analog sensors such as potentiometers, optical sensors such as a lateral effect photo diode, velocity sensors (e.g., tachometers) and/or acceleration sensors (e.g., accelerometers). Furthermore, either relative or absolute sensors can be employed.

Actuators 70 transmit forces to particular controls of device 10 in one or more directions along one or more degrees of freedom in response to signals output by microprocessor 220 and/or host computer 12, i.e., they are "computer controlled." Actuators 70 include a magnetorheological brake as described in greater detail above.

The manipulandum 56 can be a variety of different objects or manipulandums that are manipulated by a user and which can receive haptic feedback. For example, manipulandum 56 can be a crank arm of a fishing pole device, pedals of bicycle simulator, or a knob. Manipulandum can be in other embodiments a joystick, mouse, steering wheel, stylus, or other object. The housing of the entire device 10 can also be actuated, e.g. with vibrotactile sensations.

Other input devices 234 can optionally be included in device 10 and send input signals to microprocessor 220 and/or host computer 12. Such input devices can include buttons, dials, knobs, switches, voice recognition hardware (with software implemented by host 12), or other input mechanisms as described above. Safety or "deadman" switch 236 can be included in some embodiments of device 10 to provide a mechanism to allow a user to override and deactivate forces output by actuators 70, or require a user to activate actuators 70, for safety reasons.

While this invention has been described in terms of several preferred embodiments, it is contemplated that alterations, permutations, and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations and equivalents as fall within the true spirit and scope of the present invention.

What is claimed is:

1. A device, comprising:
    a manipulandum moveable in at least one degree of freedom, the manipulandum being a crank arm of a simulated fishing reel, the simulated fishing reel being coupled to at least a portion of a simulated fishing rod;
    a sensor configured to determine a position of said manipulandum in said at least one degree of freedom and output a sensor signal based on data values associated with the position of said manipulandum; and
    a brake including a fluid having a variable viscosity, the brake being configured to vary the fluid viscosity by adjusting an electromagnetic field in said fluid, the brake configured to apply a resistive force associated with the fluid viscosity to said manipulandum, a magnitude of the resistive force being associated with the sensor signal.

2. The device of claim 1, wherein said brake is a magnetorheological brake, the fluid is a magnetorheological fluid having the viscosity that can be controlled by adjusting a magnetic field, the magnetic field being adjusted by controlling an electric current in a coil.

3. The device of claim 1, wherein the resistive force is based on a degree of contact of a portion of said brake with said manipulandum, the degree of contact being based on said controlled viscosity of said fluid and associated with the sensor signal.

4. The device of claim 2, wherein the resistive force is based on a degree of contact of said brake with said manipulandum, the degree of contact being based on said controlled viscosity of said magnetorheological fluid and associated with the sensor signal.

5. The device of claim 4, wherein the degree of contact is between a surface coupled to said manipulandum and an element of the brake including said fluid.

6. The device of claim 5, wherein the at least one degree of freedom is a rotary degree of freedom, said surface being part of a disk made of a magnetically permeable material, said disk being coupled to said manipulandum.

7. The device of claim 5, wherein the at least one degree of freedom is a linear degree of freedom, and said surface is part of a plate made of a magnetically permeable material, said plate being coupled to said manipulandum.

8. The device of claim 5, wherein said brake includes a U-shaped member, said element being coupled to a prong of said U-shaped member and a coil being wound about a central portion of said U-shaped member.

9. The device of claim 1, wherein movement of said manipulandum is operative to update data values associated with a graphical simulation.

10. The device of claim 2, further comprising a local microprocessor, said microprocessor configured to receive force information from a host computer and control said electric current in said coil.

11. The device of claim 1, further comprising an actuator, said actuator configured to output a vibrotactile sensation.

12. A device, comprising:
    at least a portion of a rod;
    a housing coupled to the portion of said rod and including a crank arm, said crank arm being moveable in a rotary degree of freedom;
    a sensor configured to determine a position of said crank arm in said at least one degree of freedom and output a sensor signal based on data values associated with the position of the crank arm; and
    a brake including a fluid having a variable viscosity, the brake being configured to vary the fluid viscosity by adjusting an electromagnetic field in said fluid, the brake configured to apply a resistive force associated with the fluid viscosity to said crank arm, a magnitude of the resistive force being associated with the sensor signal.

13. The device of claim 12, wherein said fluid is a magnetorheological fluid having a viscosity configured to be modified by a magnetic field generated by an electric current in a coil.

14. The device of claim 12, wherein said fluid is a electrorheological fluid having a viscosity controlled by an electric field generated by an electric current.

15. The device of claim 12, wherein the resistive force is modified by modifying a degree of contact of said brake with said crank arm, the degree of contact being based on said viscosity of said fluid.

16. The device of claim 12, further comprising an actuator, said actuator outputting a vibrotactile sensation.

17. The device of claim 16, wherein said actuator is configured to output said vibrotactile sensation by moving an inertial mass.

18. The device of claim 13, further comprising a local microprocessor, said microprocessor configured to receive force data from a host computer and control said electric current in said coil.

19. A method, comprising:
    sensing a position of a manipulandum in at least one degree of freedom and outputting a sensor signal based on data values associated with said position, said manipulandum being a crank arm of a simulated fishing reel, the simulated fishing reel being coupled to at least a portion of a simulated fishing rod;

receiving haptic feedback data from a host computer, said haptic feedback data associated with a haptic sensation to be output; and outputting a resistive force on said manipulandum using a magnetorheological brake, said brake including a magnetorheological fluid having a variable viscosity, a magnitude of the resistive force being associated with the sensor signal;

modifying the resistive force on the manipulandum, the resistive force being associated with the viscosity of the magnetorheological fluid.

20. The method of claim 19, wherein the modifying the resistive force includes modifying a degree of contact of said brake with the manipulandum, the degree of contact being based on the modified viscosity of the magnetorheological fluid.

21. The method of claim 19, wherein the manipulandum is configured to be moved in a rotary degree of freedom, and the brake includes a disk coupled to the manipulandum, the disk configured to be contacted by an element holding the magnetorheological fluid.

* * * * *